MALCOLM H. BAKER, DEC'D.
MARIE H. BAKER, ADMINISTRATRIX.
THERMODYNAMICALLY CONTROLLED ELECTRIC SWITCH.
APPLICATION FILED NOV. 8, 1915. RENEWED APR. 14, 1919.

1,328,482.

Patented Jan. 20, 1920.

Inventor,
Malcolm H. Baker

UNITED STATES PATENT OFFICE.

MALCOLM H. BAKER, OF BRAINTREE, MASSACHUSETTS; MARIE H. BAKER, ADMINISTRATRIX OF SAID MALCOLM H. BAKER, DECEASED, ASSIGNOR TO KENNETH W. CROSBY, TRUSTEE, OF BOSTON, MASSACHUSETTS.

THERMODYNAMICALLY-CONTROLLED ELECTRIC SWITCH.

1,328,482.     Specification of Letters Patent.     Patented Jan. 20, 1920.

Application filed November 8, 1915, Serial No. 60,458. Renewed April 14, 1919. Serial No. 290,088.

*To all whom it may concern:*

Be it known that I, MALCOLM H. BAKER, a citizen of the United States, and a resident of Braintree, in the county of Norfolk and Commonwealth of Massachusetts, have invented certain new and useful Improvements in Thermodynamically-Controlled Electric Switches, of which the following is a specification.

My invention relates broadly to electric circuit switches containing thermo-dynamic means for partial automatic control whereby the switch is adapted to be operated in the usual manner to close the circuit, and thereafter to remain normally in circuit closing position until subsequent actuation; such actuation being effective to energize said thermo-dynamic means for automatically breaking the circuit after a predetermined time.

In particular, my invention relates to switches for electric lights, and serves the purpose of causing such lights to remain burning for a short time after the switch has been actuated to extinguish them.

In other patent applications filed by me I have shown and described switches adapted to operate in this manner, and through the means of various types of controlling mechanism, and have pointed out in detail the many commercial advantages which this type of control of lights possesses.

In the present application I have shown my invention as operative purely through thermo-dynamic means, or through the action of a thermo-dynamic element as itself directly forming the switch contacting and circuit controlling element.

Figure 1:
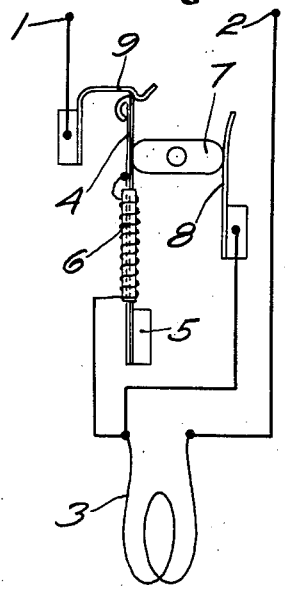
Figure 2:
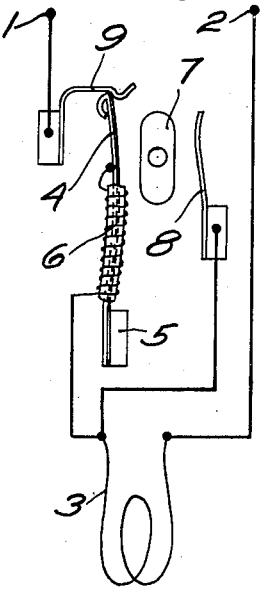
Figure 3:
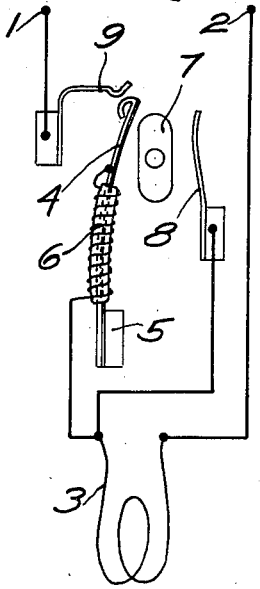
Figure 4:
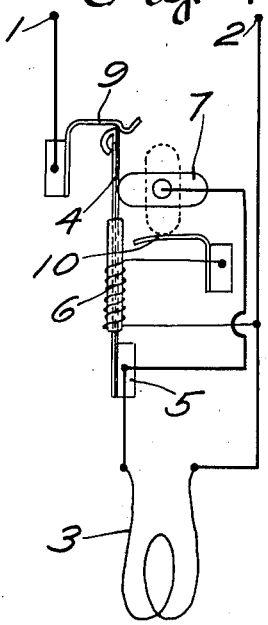
Figure 5:
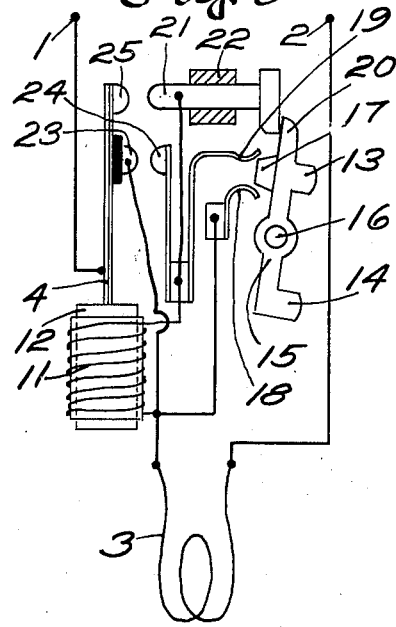
Figure 6:
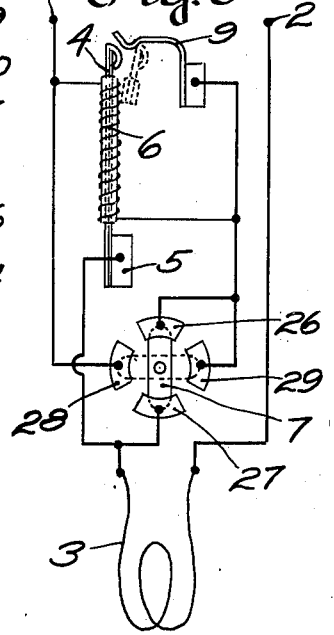

In carrying out my invention I provide contacts, in series with the electric circuit, and govern these contacts to separate by the action, or energization, of a thermostat heated by an electric resistance circuit, said circuit being energized or deënergized by the movement of the controlling means. By this arrangement, when the controlling means are moved to the "on" position the circuit is closed, and when said means are moved to the "off" position the heating resistance is energized, which in turn acts to move the thermostat to open the circuit. The time required to heat to operation, the thermostat represents the delay between the actuation of the controlling means and the actual extinguishment of the light:

I have illustrated a simple embodiment of my present invention, and certain modifications thereof, in the accompanying drawings, in which:—Figure 1 is a diagrammatical representation of a switch embodying a mechanical and electrical arrangement illustrative of the principles of the present invention; Fig. 2 shows a different position of the same switch parts; Fig. 3, also diagrammatic, shows the position of these same parts after automatic circuit-breaking action of the switch; Fig. 4 shows a modified electrical form of the simple switch arrangement of Figs. 1, 2 and 3; Fig. 5 shows a different modification in which principles of heat conductance are utilized for producing, through the medium of the thermo-dynamic device, a more elaborate automatic circuit-breaking action; Fig. 6 is still another modification, wherein through the principle of the present invention, complete automatic action of a circuit controlling switch may be electrically governed by a mechanically separate and distant auxiliary switch.

In the following description, and throughout the several views of the drawings identical parts are designated by like reference numerals.

In the drawings, in Figs. 1, 2, and 3, the terminals of the switch appear at 1, 2, and the load, indicated as the filament of an incandescent lamp, at 3. A thermostat 4 is mounted upon a block 5 and has a resistance winding 6 suitably insulated from the said thermostat but grounded at one end thereto. A control key 7 is adapted to engage the thermostat 4 and also to engage an auxiliary contact 8, and a spring catch 9 is arranged to engage the end of the thermostat 4.

In Fig. 4 the auxiliary spring is shown at 10. In Fig. 5, the winding controlling the thermostat appears at 11 and is wound upon a thermally conductive block 12 to which the thermostat 4 is attached. The means adapted to close the switch appear at 13 and the opening means at 14, and comprise buttons, as shown, mounted upon a rocking lever 15 pivoted at 16. This lever carries an extension 17 adapted to engage spring contacts 18, 19, and also carries a second extension 20 to engage the end of a sliding rod 21 moving in a guide block 22. The thermostat 4 carries an insulating contact 23, adapted to engage a contact 24, which is spring mounted, and also carries a grounded contact 25 engaging the end of the rod 21.

In Fig. 6, the key 7 engages, at the "on" position, with spring contacts 26, 27, and in the "off" position with similar contacts 28, 29.

The operation of the device of Figs. 1, 2, and 3, is as follows,—when the key is moved to the "on" position the thermostat 4 is forced under the catch 9, in which position it is maintained by said key. The thermostat possesses sufficient resiliency to permit of this movement. The circuit is now closed by the contacting of the members 9, 4, and at the same time the resistance winding 6 is short-circuited by the contact of the key 7 with the member 8. To open the circuit the key 7 is moved to the position shown in Fig. 2, which frees the thermostat, the movement thereof being, however, restrained by the catch 9, so that the circuit remains closed. The breaking of contact between the key 7 and the member 8 has, however, opened the shunt circuit around the resistance 6, so that said resistance is now directly in series with the load. The thermostat is therefore heated, and soon stores up enough energy to spring or snap it out of engagement with the member 9, thus opening the entire circuit. This last relation of parts is shown in Fig. 3.

In Fig. 4 the operation is identical with the above, save that when the key 7 is moved to the "off" position the resistance 6 is placed in shunt to the switch load. Of course in Figs. 1 to 3 inclusive the light is slightly dimmed when the key is moved to the "off" position, while in Fig. 4 no such change appears at that time.

In Fig. 5, when the button 13 is pushed the rod 21 is moved against the contact 25 to close the switch circuit through the resistance winding 11. This winding is, however, shunted out, as before, by the engagement of the member 17 with the clips 18, 19. When desired to open the circuit the button 14 is pushed, which moves member 17 out of engagement with 18, 19, thus operatively energizing the winding 11 and heating the block, preferably of copper or other heat conductive material, upon which the thermostat is mounted. When this block 12 is heated it transmits heat to the thermostat 4 which now bends forward until the contact 23 touches the spring mounted contact 24, at the same time pushing along the rod 21 while maintaining the main circuit closed through contact at 21, 25.

When 23, 24, engage the winding 11 is short circuited and therefore ceases to heat the block 12, but the said block, through its stored up heat, continues to cause movement of the thermostat for a brief period, thus giving to the rod 21 a slight increment of movement after deënergization of the resistance winding 11, the spring contact 24 of course yielding to permit this movement while maintaining contact at 23–24.

As the block ceases to transmit heat to the thermostat, the latter halts in movement, and then reverses movement, separating contact 25 from the rod 21 and thus breaking the circuit, said break taking place before the contacts 23, 24 separate, because of the described additional increment of movement given to the rod 21. After the circuit has been broken the thermostat of course continues its cooling movement and causes contact 23 to separate from contact 24. In this particular form of my invention the action had upon the lamp is that, when the key is moved to the "off" position, the said lamp first dims, then rises again to full candle power, and then goes out.

In Fig. 6 a form of my invention is shown in which the action is purely under thermodynamic control, the key exercising no mechanical function save to close or open electrical contacts. Here, when the key is moved to the "on" position the circuit is closed through the resistance winding 6 and clips 26, 27. This heats the thermostat to bend the same until the end thereof contacts with the member 9 and slips preferably, into catch engagement therewith, as shown by broken lines in the figure. This closes a circuit around the clips 26, 27. The switch is now normally closed, but with the resistance 6 constantly in series with the lamp, the said resistance being made as low as possible to involve the least loss of energy. To open, the key 7 is swung to leave the clips 26, 27, and engage the clips 28, 29, thus completing a shunt circuit around the resistance 6 to deënergize same. The thermostat is now cooled and bends to snap out of engagement with the catch 9, whereby the circuit is opened.

While the member 9 is shown as of catch form to attain a quick break in the form of the device shown in Fig. 6, this is not necessary to actual operation in said figure, as the contact might be made, here, by the simple touching together of the pieces 4, 9. In this case the thermostat might be made so delicate as to operate under the heat generated by only two or three turns of wire in the resistance winding, which amount would have no appreciable effect in dimming the normal operation of the light or in reducing the efficiency of the lamp. It will be noted that this form, of Fig. 6, affords what may be termed a "remote control" since the button 7 and contacts governed thereby might be located at a distance from the rest of the switch structure.

Of course many other arrangements and forms of thermostats are possible without departing from the spirit of my invention, and, therefore, without limiting myself to the precise embodiment of my invention herein illustrated and described, what I claim is,—

1. An electric circuit switch embodying in combination; a yielding contact member; a coöperative contact element comprising a thermo-dynamically impelled conductor adapted upon suitable thermal change to break contact with said member; a heating resistance for said element; a manually controllable device operatively related to said element whereby said element may be placed and normally maintained in contact with said member; auxiliary circuit-controlling means operably related to said device for governing said heating resistance, whereby the latter is energized at one position of said device and deënergized at another position thereof.

2. An electric circuit switch embodying in combination; a resilient contact member having a yielding latch formation; a coöperative contact element comprising a thermo-dynamically impelled conductor adapted upon suitable thermal change to break contact with said member; a heating resistance for said element; a manually controllable device operatively related to said element whereby said element is placed and normally maintained yieldingly latched in contact with said member; auxiliary circuit-controlling means operably related to said device for governing said heating resistance, whereby the latter is energized at one position of said device and deënergized at another position thereof.

3. An electric circuit switch embodying in combination; a yielding contact member; a coöperative contact element comprising a resilient thermostat adapted upon suitable thermal change, by flexure thereof, to break contact with said member, and a resistance for heating said thermostat; a manually controllable device operatively related to said element whereby said element may be placed and maintained normally in contact with said member; auxiliary circuit-controlling means operably related to said device for governing said heating resistance, whereby the latter may be energized at one position of said device and deënergized at another position thereof.

4. An electric circuit switch having a flexing thermostat as one contact member, a second and resilient contact member having a latch formation to hold said two members in contact one with the other against a predetermined separating tension, the said thermostat being adapted, upon energization, to move away from the said resilient member to open the switch, an electric heater for the thermostat with connections arranged to energize said heater from the switch circuit, manual controlling means adapted to put and to maintain said members in contact one with the other, and circuit connections controlled by said means and arranged so that different positions of said means will respectively close the switch, or operatively relate the heater to the switch circuit to cause opening of the switch by the thermostat.

5. An electric circuit switch embodying in combination; a yielding contact member; a coöperative contact element comprising a thermo-dynamically impelled conductor adapted upon suitable thermal change to break contact with said member, and a heating resistance for said element; a manually controllable device operatively related to said element whereby said element may be placed and maintained normally in contact with said member; auxiliary circuit-controlling means operably related to said device for governing said heating resistance, whereby the latter may be operatively energized to heat said element by being placed in series to the switch governed load.

6. An electric circuit switch embodying in combination; a resilient contact member having a yielding latch formation; a coöperative contact element comprising a resilient thermostat adapted upon suitable thermal change, by flexure thereof, to break contact with said member; and a resistance for heating said themostat; a manually controllable device operatively related to said element whereby said element may be placed and normally maintained yieldingly latched in contact with said member; auxiliary circuit-controlling means operably related to said device for governing said heating resistance, whereby the latter may be operatively energized to heat said element by being placed in series to the switch governed load.

7. An electric switch embodying in combination; a combined spring detent and contact member having a snap-release, latch formation at its free end; a resilient thermostat mounted at one end and provided at its free end with a cam formed contact adapted by mechanical caused flexure of said thermostat to be moved into tensioned and yieldingly latched engagement with said member and by thermally caused flexure of said thermostat, to be snapped out of such engagement; a heating resistance winding carried by the thermostat and insulated therefrom; a cam key pivoted for wiping and conductive engagement with said thermostat for causing said flexure thereof; and an auxiliary circuit controlling arrangement comprising a contact leaf adapted conductively to be engaged by said cam key for rendering deënergized said heating resistance until withdrawal of said device from its said engagement with the thermostat.

Signed at Boston, in the county of Suffolk and Commonwealth of Massachusetts, this 4th day of November, 1915.

MALCOLM H. BAKER.

Witnesses:
RAYMOND D. SMITH,
SILVIO AMOROSO.